United States Patent [19]
Blum

[11] 3,940,734
[45] Feb. 24, 1976

[54] SEPARATE SURFACE, COMMON DEPTH POINT STACK

[75] Inventor: Clement J. Blum, Plano, Tex.

[73] Assignee: Texas Instruments Incorporated, Dallas, Tex.

[22] Filed: June 22, 1973

[21] Appl. No.: 372,711

[52] U.S. Cl. ............... 340/15.5 CP; 340/15.5 MC; 340/15.5 TD
[51] Int. Cl.² ......................................... G01V 1/36
[58] Field of Search ............ 340/15.5 CP, 15.5 MC, 340/15.5 DS, 7, 15.5 TD

[56] References Cited
UNITED STATES PATENTS

| | | | |
|---|---|---|---|
| 3,353,152 | 11/1967 | Kerns | 340/15.5 DS |
| 3,747,056 | 7/1973 | Treybig et al. | 340/15.5 MC |
| 3,794,827 | 2/1974 | Widess | 340/15.5 TD |

OTHER PUBLICATIONS

Mayne, "Practicle Considerations in the Use of CRP Techniques," 4/67, pp. 225–229, Geophysics, Vol. 32, No. 2.
Brewer, "How Horizontal Stacking has Affected the Oil Industry," 10/67, pp. 137–149, World Oil.

Primary Examiner—Maynard R. Wilbur
Assistant Examiner—N. Moskowitz
Attorney, Agent, or Firm—Hal Levine; Rene' E. Grossman; Leo N. Heiting

[57] ABSTRACT

Near surface anomalies in common depth point seismic surveying are identified by divergence between two records which are obtained by (1) wherein generating a set of common depth point traces with full or partial fold coverage by combining traces containing energy reflected from common depth points and detected in all or a first fraction of the surface detector spread; and (2) generating a further set of common depth point traces with partial fold coverage by combining traces containing energy reflected from the same common depth points but detected in a second fraction of the surface detector spread. The first and second fractions will not be common. Similarly, this technique is used in verifying the accuracy of static corrections applied in seismic processing since erroneous corrections give rise to anomalies which can be identified.

24 Claims, 5 Drawing Figures

SEPARATE SURFACE, COMMON DEPTH POINT STACK

This invention relates to common depth point seismic surveying, and more particularly to the identification of near surface or static anomalies in seismic data by producing two or more common depth point stacks which do not have surface locations common between them as to the output traces having common depth points.

In U.S. Pat. No. 2,732,906 to Mayne, seismic exploration utilizing what is generally known as common depth point stacking is disclosed. In such common depth point operation, the signal-to-noise ratio of the seismic data is greatly enhanced by combining single coverage seismic traces having common depth points but different shot point-detector spacings after static and normal moveout corrections have been applied to the respective traces.

In a given set of such common depth point seismic traces, it may be different to differentiate between true subsurface structural features and features caused by anomalous conditions near the surface or caused by application of inaccurate corrections, called static anomalies. Time anomalies, small in lateral extent with respect to the reflection seismic spread, can be easily identified, if signal-to-noise ratio is sufficiently good, by careful examination of single coverage recordings. These can be seen on successive single coverage recordings to occur in a manner directly related to their location with respect to the surface. Structural features can be seen on successive single coverage recordings, as time anomalies occurring in successive single coverage recordings in a manner related directly to their location in the subsurface. Seismic recordings generally are multitrace recordings having the trace length in terms of time and the trace amplitude in terms of amplitude, velocity, or acceleration of movement of the earth's surface as seismic energy reflected from depth reaches the surface. It will be apparent that anomalies of significant magnitude may be due to structural features in the rear surface zone rather than at depth. Such structural features cause reflections from depth points to appear time shifted. Except for the fact that the presence of the anomalies in the near surface be delineated and properly compensated, an erroneous interpretation of the subsurface results.

Various techniques have been developed for identifying the presence of static anomalies. The present invention provides for certainty in that task in connection with the processing of large amounts of data and particularly, in a manner such that the data may be treated and presented graphically to portray the presence of surface anomalies which may then be compensated.

More particularly, in accordance with the present invention, common depth point seismic traces comprises two or more common depth point stacks by summing, for each of a number of individual depth point locations, two or more traces having such common depth point for each stack. Surface locations are not completely common to those output traces having common depth points.

More particularly, in accordance with the present invention, there is provided a method of delineating near surface anomalies by common depth point seismic surveying wherein a shot point and a detector spread continuously move along a traverse. A first set of traces is generated by combining traces containing energy reflected from common depth points to produce full fold coverage of said common depth point. A second points of common depth point traces is then generated for the same traverse with partial fold coverage only. This is done by combining traces containing energy reflected from the same common depth point but detected in a fraction of the surface detector spread. In another aspect of the invention, two sets of traces are generated each with partial fold coverage only, where the fractions of the surface detector locations employed in generating the two sets of partial fold common depth point traces are spaced one from another and do not have surface locations common between them. In either case, the presence of near surface anomalies will then be indicated by differences between time occurrences of the same seismic event in the two sets.

For a more complete understanding of the present invention and for further objects and advantages thereof, reference may now be had to the following description taken in conjunction with the accompanying drawings, in which.

Figure 1:
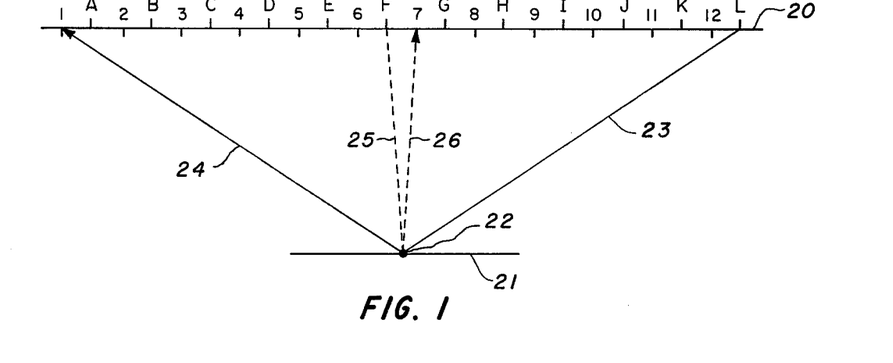
FIG. 1 illustrates one spread in a field arrangement for a full fold common depth point stacking technique.

By way of background, FIG. 1 illustrates a method of generating seismic signals in the form of time-amplitude traces for full fold common depth point coverage. A line 20 on the earth's surface forms a seismic traverse along which there are located a series of equally spaced shot or source points and receiver locations. In FIG. 1, the shot points are identified by the letters A, B, —K, L interlaced with receiver locations identified by the numerals 1,2 — 11,12. The object of the operation is to provide traces which, in a noise free manner, will identify, in terms of travel time from the surface, the location of subsurface layers, such as the layer 21.

In common depth point field techniques which are widely carried out and are conventional, a seismic impulse is successively created at each of the source points A-L with a spread of seismic detectors located at receiver points along traverse 20. In the course of such operations, there will be produced twelve seismic record traces, one on each of twelve different seismic records, all uniquely related to the common depth point 22 on the horizon 21. For example, an impulse created at shot point L may travel along incident path 23 to point 22 and then follow reflection path 24 to receiver location 1. Point 22 will be delineated with a full twelve fold coverage. The paths 23 and 24 represent the longest shot-detector spacing for common depth point 22. The shortest spacing is represented by the production of a seismic impulse at point F which may travel by way of incident path 25 to point 22 and then by reflection path 26 to receiver location 7. For a full twelve fold coverage, the seismic traces which would be combined to produce a single trace for common depth points 22 are set out in Table I.

TABLE I

| Source Point | Receiver Point |
|---|---|
| A | 12 |
| B | 11 |
| C | 10 |
| D | 9 |
| E | 8 |
| F | 7 |
| G | 6 |
| H | 5 |
| I | 4 |
| J | 3 |
| K | 2 |
| L | 1 |

By correcting each of the traces detected at receiver locations 1–12 of Table I for normal moveout as well as for known surface variations, a twelve fold trace is produced for the common depth point 22. In the above-identified Mayne patent two fold coverage is illustrated. Twelve fold coverage and twenty-four fold coverage and more are frequently employed in present day operations. Thus, the twelve fold coverage as described herein may be taken as exemplary of seismic trace production for carrying out the present invention.

Figure 2:
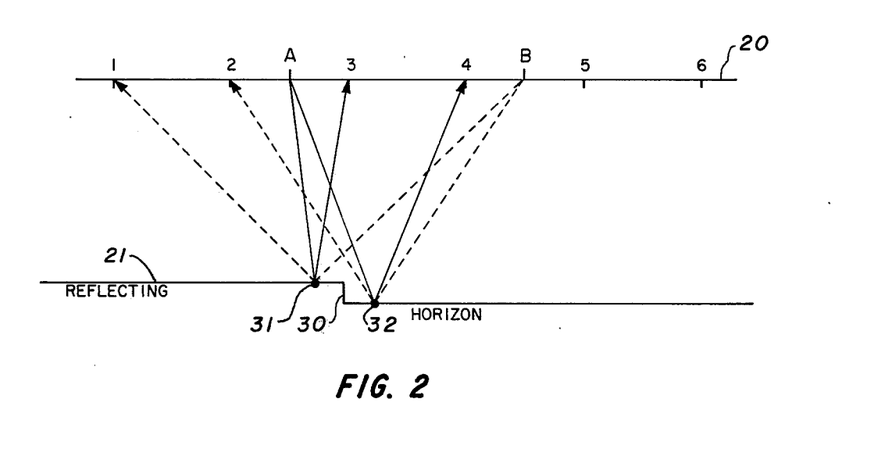
FIG. 2 illustrates a relationship involved in the identification of a structural anomaly at depth.

In FIG. 2, the travel time of a given seismic event is affected by the presence at depth of an anomaly in reflecting horizon 21 represented by the step function 30. Two shot points A and B are located along the surface traverse 20 with receiver locations 1 and 2 to the left of shot point A. receiver locations 3 and 4 between shot points A and B, and receiver locations 5 and 6 to the right of shot point B. Energy propagated from source point A downward to horizon 21, from which it is reflected back to the surface, will show a time anomaly between the recordings made at receiver locations 3 and 4 because of the presence of the sharp discrete step 30. Similarly, a recording made by generating an impulse at point B will show the same anomaly between recordings made from signals detected at receiver locations 1 and 2. The reason for this relationship is that for a horizontal structural interface which is a reflecting horizon, the point of reflection or depth point is midway between the source and receiver. The geometry of FIG. 2 is such that the recording of an impulse from source A detected at receiver location 3 and from source B detected at receiver location 1 have the common depth reflection point 31. Common depth point 32 is similarly related to the source point A-receiver location 4, and the combination source point B-receiver location 2 combination. If a reflected signal from reflecting horizon 21 is clearly seen on a recording, i.e., with a high signal-to-noise ratio, the time anomaly can be identified for the case of FIG. 2 as being due to a structural feature at depth.

Figure 3:
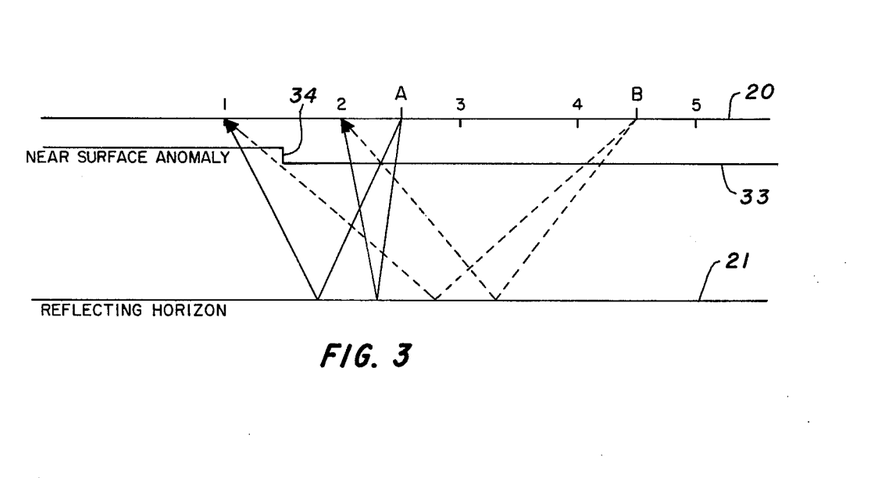
FIG. 3 illustrates the relationships involved when a near surface or static anomaly is present.

In FIG. 3, a different relationship is illustrated. Here assume that, for the same source points A and B and receiver locations 1–4 the presence of a horizontal reflecting horizon 21 beneath traverse 20. Interposed is a near surface structure 33 having a discrete anomaly 34 therein located between receiver locations 1 and 2. Thus, the anomaly 34 is related not to the subsurface but to the near surface. Anomaly 34 is of magnitude similar to anomaly 30 in FIG. 2 and can cause an anomaly in time in the resultant seismic data as it appears in a slot of the time occurrence of a reflection from the deep horizon 21. Such a time anomaly would be seen on a recording of energy generated at source point B and detected at receiver locations 1 and 2. Similarly the anomaly will be seen in the recording of signals generated at source A and detected at receiver locations 1 and 2, rather than between receivers 3 and 4 as in FIG. 2. In this way, the feature producing the effect is identified as a near surface feature related to recording at common surface points rather than a subsurface feature related to common depth points.

The problem often faced is more complex than the simple examples of FIGS. 2 and 3 because:

1. Signal-to-noise ratio is not sufficiently good on individual field recordings to accurately identify and measure times of individual reflected signals.

2. Anomalies, both those truly structural and those due to near surface effects may be broader and more subtle than the sharp discrete feature in FIGS. 2 and 3.

3. A large volume of data is processed and interpreted in many surveys and it is too laborious and time consuming to study individual records to identify and eliminate near surface anomalies.

In seismic data processing, machine corrections are often applied to eliminate the effects of near surface features provided the features are not too large with respect to the size of the seismic spread. However, it is highly desirable, particularly in common depth point procedures, to have another method to check whether correction of the near surface problems have been solved. It is further highly desirable to be able to determine whether and when static problems exist, specifically to demonstrate whether a certain feature seen in a seismic record section or other common depth point data is a true subsurface structure as graphically portrayed in FIG. 2 or a static near surface anomaly as graphically portrayed in FIG. 3.

The present invention provides a means for demonstrating whether a certain feature seen in a set of seismic records or in a composite seismic record section is a static anomaly or a true subsurface structure. In accordance with the invention, two or more common depth point stacks are produced by summing at each of a number of individual depth point locations two or more traces having the common depth point for each stack but wherein there are not completely common surface locations between them in the output traces having common depth points. In operations involving geometry such as illustrated in FIG. 1, common depth point uncommon surface point stacks are produced.

Figure 4:
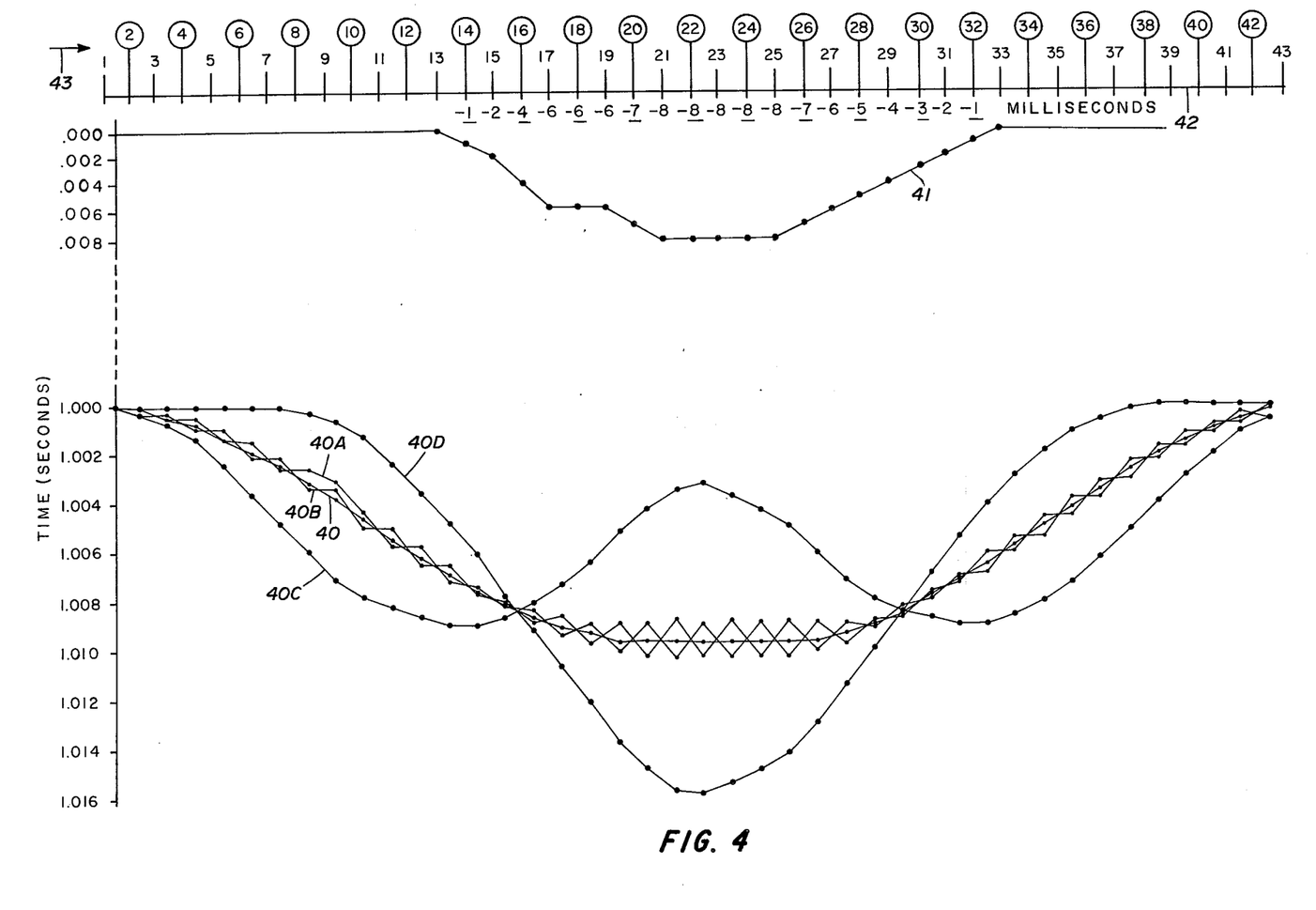
FIG. 4 illustrates the effect of a static anomaly on conventional multifold common depth point record sections and upon record sections produced in accordance with the present invention.

Referring to FIG. 4, curve 40 represents the occurrence on a time scale at about 1.0 second of a seismic reflection from a deep horizontal reflecting horizon as it would appear on a seismic record section for a region where a static anomaly represented by the curve 41 exists.

More particularly, along the traverse represented by line 42, FIG. 4, there are located source points 2,4 — 40,42 interspersed with receiver locations 1,3 — 41,43. The static feature represented by curve 41 is assumed to be located within a set of data recorded with the 12 fold common depth point coverage and a 24 trace split spread. The seismic reflection signal without the effect of the anomaly 41 imposed on it is shown at a record time of about 1.0 second. The anomaly adds time where it is traversed. As a seismic field operation moves along spread 42 in the direction of arrow 43, the first time that anomaly 41 will have an affect on a single trace recording to be used in common depth point stacking will be when a receiver at the right end of the spread is for the first time located at receiver location 15. A delay of 0.002 second will be introduced into the travel time of the signal detected by a receiver at location 15. The signal produced by detector at location 17 will suffer a delay of 0.006 second. When at source point 14, there will be introduced a delay in the travel time of the signals from that source point to any detector of 0.001 second. Upon generation of an impulse at source point 24 and detection at receiver location 23, a delay of 0.016 second is introduced with an 8 millisecond delay during downward travel and an 8 millisecond delay during upward travel. Thus, the effect of the anomaly is to delay all signals because of travel through a low velocity surface body having the time delay character of the line 41.

A reflecting horizon at a depth represented by a record time of 1.000 second would then appear as a nonhorizontal reflector. Rather, it would appear to be in the form of a valley as represented by the line 40.

As above indicated, the presence of anomaly 41 is to be indicated. This is done by producing multifold common depth point sets of data with uncommon surface coverage.

To illustrate, it will be appreciated that there are many different sets of source points and receiver locations that could be employed for producing multifold common depth point seismic record sections. For example, in Table II, using the notation of source point and receiver locations of FIG. 1, two six fold common depth point sets of signals with common surface are set out.

TABLE II

|  | Source Point | Receiver Locations |
| --- | --- | --- |
| Set (A) | A | 12 |
|  | B | 11 |
|  | C | 10 |
|  | D | 9 |
|  | E | 8 |
|  | F | 7 |
| Set (B) | G | 6 |
|  | H | 5 |
|  | I | 4 |
|  | J | 3 |
|  | K | 2 |
|  | L | 1 |

That is, set A would involve the use of impulses generated at shot points A-F and detected at receiver locations 12-7, respectively. The second set B would involve impulses generated at source points G-L and detected at receiver locations 6-1, respectively. The common surface coverage provided by sets A and B will be apparent from inspection of FIG. 1.

Signals showing the effect of the anomaly 41, FIG. 4, are plotted for the common depth point common surface sets A and B. Signals secured using set A are recorded to form the curve 40A. The signals secured using set B are recorded to form curve 40B. Note that curve 40A and 40B generally track the twelve fold curve 40 still portraying the apparent presence of a valley at depth.

In contrast with such procedures, the present invention involves use of common depth point sets with uncommon surface locations. Suitable sets are shown in Table III.

TABLE III

|  | Source Point | Receiver Locations |
| --- | --- | --- |
| Set (C) | A | 12 |
|  | B | 11 |
|  | C | 10 |
|  | J | 3 |

TABLE III-continued

|  | Source Point | Receiver Locations |
| --- | --- | --- |
|  | K | 2 |
|  | L | 1 |
| Set (D) | D | 9 |
|  | E | 8 |
|  | F | 7 |
|  | G | 6 |
|  | H | 5 |
|  | I | 4 |

As shown in Table III, a set C involves generation of seismic impulses at source points A, B, C, J, K and L are detecting the resultant energy at receiver locations 12, 11, 10, 3, 2 and 1, respectively. The second set B, with uncommon surface relative to set A, involves generation of a seismic impulse at each of source points D, E, F, G, H and I and detecting the resultant seismic waves at receiver locations 9, 8, 7, 6, 5 and 4, respectively.

Signals recorded in FIG. 4 for such uncommon surface location results in two widely divergent curves. More particularly, signals produced from the common depth point uncommon surface set C of Table III when recorded define curve 40C. Signals produced by utilizing a common depth point uncommon surface set D of Table III when recorded define curve 40D. The wide divergence between curves 40C and 40D represents a benefit resulting from employing the present invention, i.e., a dramatic indication of the presence of an anomaly near surface, rather than variation in depth of a deep subsurface reflecting horizon. The pattern of curves 40A-40D results from the spread entering, encompassing and passing beyond the location of the surface anomaly 41. The divergence between curves 40C and 40D provides a clear indicator of static correction problems.

Utilization of the present invention would generally be as follows.

The field procedure would be to carry out a multifold common depth point set of operations by successively generating seismic impulses at each of points 2,4 — 40,42 of FIG. 4 as well as at other stations at the ends of traverse 42 not shown in FIG. 4. After the field recordings are collected, the stacking with full fold techniques would then be carried out to produce a set of common depth point seismograms or a common depth point seismic record section on which reflections, such as those represented by the curve 40, FIG. 4, would appear.

A second record section would then be produced using a fraction of the full fold common depth point set, with the fraction being limited to produce partial fold coverage by combining traces containing energy reflected from common depth points but detected in a first fraction of each surface detector spread. Such a seismic record section would then include a curve such as curve 40C if a static anomaly such as represented by the line 41 is present.

A third seismic record section would then be generated with partial fold coverage by combining traces containing energy reflected from common depth points and detected in a second fraction of each surface detector spread where the first fraction (curve 40C) and a second fraction (curve 40D) are spaced one from another on the earth's surface in a manner such as represented by the uncommon surface locations of sets C and D, Table IV. The resultant curve 40D would then appear on a seismic record section having a surface of static anomaly such as that represented by curve 41. The three record sections clearly show the differences between the curves 40C and 40D to provide guidance in interpretation of the full fold record section upon which reflections represented by the curve 40 appear.

Thus, in the sets C and D, Table III, a depth point is common but input traces are so selected that different or separate surface locations are involved. A static anomaly would not be common to the two stacks. The two stacks test the validity of observed anomalies. For the purpose of the present invention they are called selective surface, a common depth point stacks.

A number of other stacks of lesser fold can also be selected from the twelve possibilities. Four such possibilities are set out in Table IV, sets E, F, G and H having a four fold coverage

TABLE IV

|  | Source Point | Receiver Point |
|---|---|---|
| Set (E) | A | 12 |
|  | B | 11 |
|  | C | 10 |
|  | D | 9 |
| Set (F) | E | 8 |
|  | F | 7 |
|  | G | 6 |
|  | H | 5 |
| Set (G) | I | 4 |
|  | J | 3 |
|  | K | 2 |
|  | L | 1 |
| Set (H) | A | 12 |
|  | B | 11 |
|  | K | 2 |
|  | L | 1 |

Sets E and G have essentially common surface. Sets F and H have separate surface coverage and thus may be employed in accordance with the present invention.

In FIG. 4, if the surface anomaly represented by curve 41 were properly corrected out of the data, the use of sets C and D would result in curves 40C and 40D coinciding. True subsurface structure would manifest similarly in stacks of sets A–D since they all have common depth points.

The principle embodied in the present invention of selecting sets of signals with a common depth point but separate surface is shown above to apply to signals taken along a line of seismic profiling such as traverse 20 of FIG. 1 or traverse 42 of FIG. 4. However, the invention need not be limited to signals taken along a straight line. Any sets of traces constrained to have common depth points but separate surface can be used to test for and display the validity of true structures as opposed to static anomalies. Such sets of traces could be subsets of previously recorded traces or traces specially recorded for the specific purpose of testing validity of true structures in areas where static anomalies may be present.

In the foregoing discussion it has been shown that the use of two or more common depth point uncommon surface sections can indicate the occurrence of static anomalies. Means for producing common depth point sections are well known and in common use. For example, known photographic means may be employed in recording seismic record sections to include the traces represented by curves 40C and 40D on the same sheet. Divergences between the curves would portray the presence of surface anomalies. Where the two sets of traces coincide, no static anomalies are present. Thus, common depth point traces are produced with partial fold coverage by combining traces containing energy reflected from common depth points and detected in a first fraction of each surface detector spread. Another set of common depth point traces is generated for the same traverse with partial fold coverage by combining traces containing energy reflected from the common depth points and detected in a second fraction of each subsurface detector spread. The first and second fractions of the spread in accordance with the present invention are spaced one from another along the earth's surface and have no common points. By this means, the presence of a near surface anomaly is portrayed by differences between time occurrences of the same seismic events in the two sets of traces.

Figure 5:
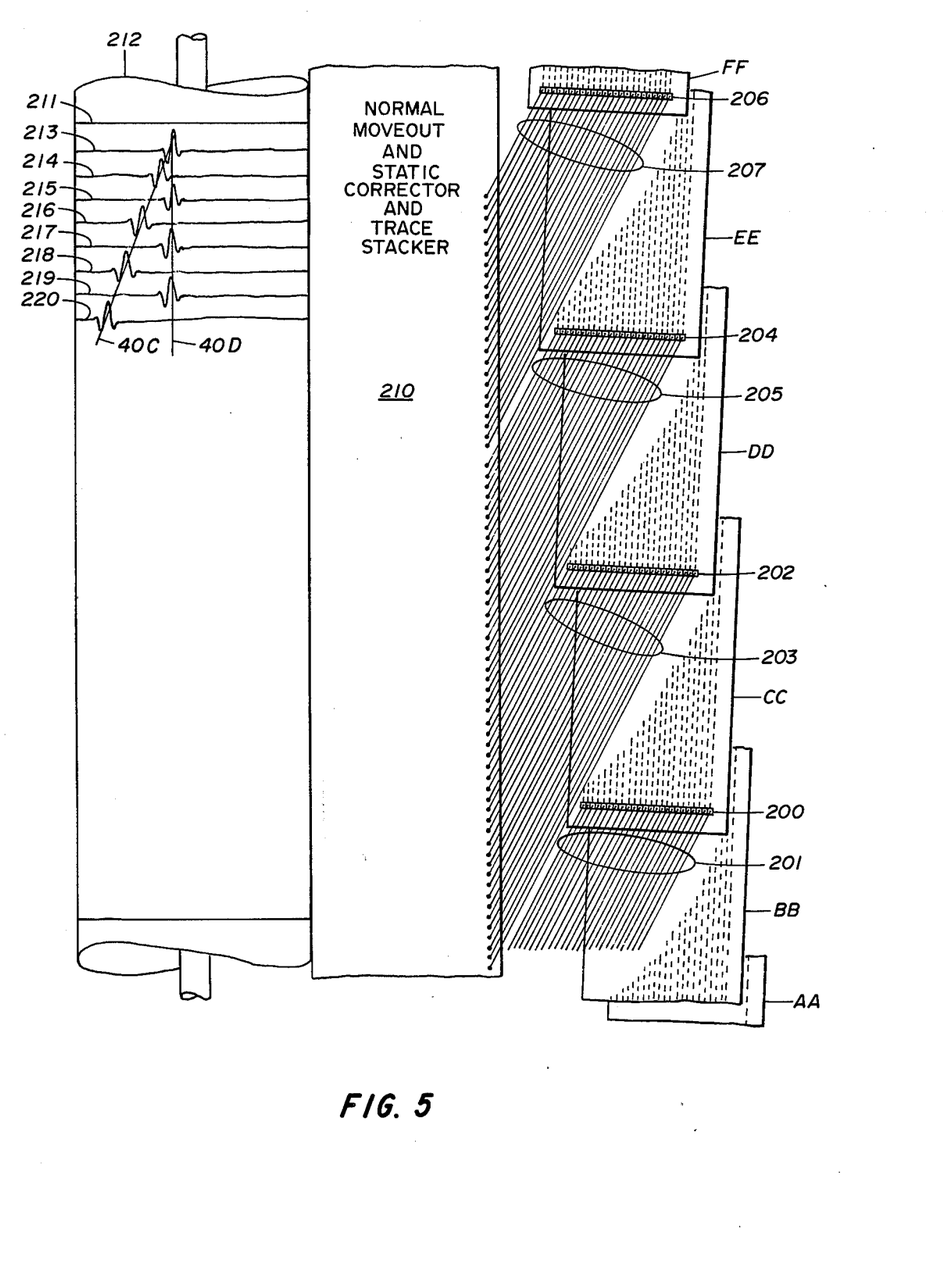
FIG. 5 illustrates a system for stacking traces in accordance with the invention.

Referring now to FIG. 5, records AA-FF are shown only in part. Record AA is the record produced by generating seismic energy at source point 2, FIG. 4, and detecting the resultant seismic waves in spread comprising twelve detectors at locations 3,5 — 25 to the right of point 2 and a similar set of twelve located to the left of point 2. Similarly, records BB, CC, DD, EE and FF are records produced by successively generating seismic energy at source points, 4, 6, 8, 10 and 12, respectively, and detecting the resultant energy at relocated 24 location spreads, each symmetrical to its source point.

FIG. 5 represents a known stacking system wherein the records such as record CC comprising 24 traces of digitized magnetically recorded data moves past a set of reproducing heads 200 to produce on lines 201 a set of signals representing the data recorded on record CC. Similarly, reproducing heads 202 produce on line 203 signals representative of the data on record DD. Playback heads 204 produce on line 205 signals representative of record EE and playback heads 206 produce on line 207 signals representative of data on record FF. The lines 201, 203, 205, 207 from the other records are connected to a static and normal move out correction unit and trace stacker unit 210. In unit 210, the traces are corrected for computed static variations and for normal move out and are then stacked generally in accordance with the procedures disclosed in Mayne U.S. Pat. No. 2,732,906.

Thus, there may be produced an output which may be in the form of wiggly trace record section, or of variable area, variable density or combinations thereof to portray the subsurface structural character of the area covered by the common depth reflecting points. A record sheet 211 may be placed on a recording drum 212 to receive the output signals, resulting in a multifold composite of the traces from the various seismograms.

On sheet 211 the first portion of a plot of traces represented in FIG. 4 is shown. Trace 213 is the common depth point stack of set C, Table III. Trace 214 is the common depth point stack of set D, Table III. Traces 213 and 214 are thus common depth point traces with separate surface locations. Trace 215 is the next common depth point stack of the type of set C and trace 216 is the next common depth point stack of the type of set D. Further output traces continue this pattern. Thus, the lines 40C and 40D, FIG. 5, represent the beginnings of the corresponding curves 40C and 40D of FIG. 4.

While traces 213–220 are shown as if displayed on the same record sheet 211, normally the set C will be recorded on one section sheet and set D will be recorded on a second section sheet in order to facilitate analysis.

This unit 210, FIG. 5, has been shown in block form. Such systems are well know.

Normal move out and static corrections have been heretofore carried out by analog means as shown by U.S. Pat. No. 3,092,805 to Romberg. Static corrections and normal move out corrections are today routinely carried out digitally in seismic exploration systems. For example, such operations are offered as commercial services available from Geophysical Service, Inc. of Dallas, Texas, as shown by GEOPHYSICS, Aug. 1964, back cover, and by GEOPHYSICS, April 1968 and June 1968 cover disclosures. Thus, while common depth point stacking techniques are well known, the relationships involved in common depth point uncommon surface stacks have not heretofore been known nor the use thereof to signal the presence of uncorrected static anomalies.

Further variations in the manner in which the two sets of common depth point stacks with uncommon surface coverage can be developed and presented will be apparent.

A seismic record section having divergence such as between curves 40C and 40D, FIG. 4, must be corrected in order to properly determine the subsurface structure.

As a first approximation to correction, it might be assumed that the static correction could be accomplished by introducing negative time shifts equal in magnitudes to the deviations from the time 1.000 second as represented by curve 40, FIG. 4. Such corrections thus indicated may be introduced into all the traces involved. A corrected common depth point stack may then be produced. A test would then be made, in accordance with the present invention, to determine if the record section has been properly corrected. If common depth point, uncommon surface sections made in accordance with the descriptions herein displaced identical times of reflection occurrence, then accurate correction would be indicated and the analysis could proceed as to the nature of the subsurface structure.

It will be recognized that, for the case above suggested where the surface anomaly was assumed to have delay values proportional to the values of the divergence from the 1.000 second time of FIG. 4, the correction would not be a correct one. Such imperfect correction for static anomaly would then be again reflected by divergence between common depth point uncommon surface sections. By whatever means correction is introduced, the present invention provides a test for remnant error. Thus, the present invention is primarily directed to signaling error in CDP data due to uncorrected statics.

As mentioned above, practice of the invention need not be limited to signals generated and detected along a linear traverse. For example, in accordance with copending application Ser. No. 372,712, filed June 22, 1973, entitled "Multifold Seismic Exploration Over Purposefully Crooked Traverses", common depth point field practices are carried out along traverses that are not straight lines but rather are sawtooth or otherwise serpentine in configuration. In such operations areal common depth point subsurface coverage is achieved. In such operation, sets of common depth point common surface traces are produced. However, sets of common depth point, uncommon surface traces will be segregated in accordance with the present invention for the production of contrasting record sections to indicate the presence of near surface anomalies on an areal basis.

Having described the invention in connection with certain specific embodiments thereof, it is to be understood that further modifications may now suggest themselves to those skilled in the art and it is intended to cover such modifications as fall within the scope of the appended claims.

What is claimed is:

1. The method of delineating near surface anomalies in common depth point seismic surveying where a shot point and detector spread are moved successively along a traverse which comprises:

a. generating a first set of common depth point traces for said traverse with partial fold coverage by combining traces containing energy reflected from common depth points and detected in a first fraction of the surface locations in spreads of full fold detector locations, and b. generating a second set of common depth point traces for said traverse with partial fold coverage by combining traces containing energy reflected from said common depth points and detected in a second fraction of the surface locations in spreads of full fold detector locations where said first fraction and said second fraction are spaced one from another on the earth's surface, whereby the presence of near surface anomalies is indicated by differences between time occurrences of the same seismic event in said first and second sets.

2. The method of delineating near surface anomalies in common depth point seismic surveying where a shot point and detector spread are moved successively along a traverse which comprises:

a. generating a first set of common depth point traces for said traverse with full fold coverage for production of each trace in said first set, b. generating a second set of common depth point traces for said traverse with partial fold coverage by combining traces containing energy reflected from common depth points and detected in a first fraction of the surface locations in spreads of full fold detector locations, and c. generating a third set of common depth point traces for said traverse with partial fold coverage by combining traces containing energy reflected from said common depth points and detected in a second fraction of the surface locations in spreads of said full fold detector locations where said first fraction and said second fraction are spaced one from another on the earth's surface, whereby the presence of near surface anomalies is indicated by differences between time occurrences of the same seismic event in said first, second and third sets.

3. The method of delineating near surface anomalies in common depth point seismic surveying where a shot point and detector spread are moved continuously along a traverse which comprises:

a. generating a first set of common depth point traces for said traverse with full fold coverage by combining traces containing energy reflected from common depth points, and b. generating a second set of common depth point traces for said traverse but with only partial fold coverage by combining traces containing energy reflected from said common depth points and detected in a fraction of the surface locations in spreads of full fold detector locations, whereby the presence of near surface anomalies is indicated by differences between time occurrences of the same seismic event in said first and second sets.

4. The method of delineating near surface anomalies in common depth point seismic surveying which comprises:
  a. moving shot points and detector locations successively along a traverse to produce single coverage traces for full fold common depth point coverage,
  b. generating a first set of full fold common depth point traces for said traverse,
  c. generating a second set of common depth point traces for said traverse with partial fold coverage by combining traces containing energy reflected from common depth points and detected in a first fraction of the surface locations in spreads of full fold detector locations, and
  d. generating a third set of common depth point traces for said traverse with partial fold coverage by combining traces containing energy reflected from said common depth points and detected in a second fraction of the surface locations in spreads of full fold detector locations where said first fraction and said second fraction are spaced one from another on the earth's surface, whereby the presence of near surface anomalies is indicated by differences between time occurrences of the same seismic event in said first, second and third sets.

5. The method of delineating near surface anomalies in common depth point seismic surveying where a shot point and detector spread are moved successively to locations along a traverse which comprises:
  a. generating a first set of partial fold common depth point traces for said traverse, and
  b. generating a second set of partial fold common depth point traces for said traverse where said first set and said second set have common depth points but uncommon coverage on the earth's surface, whereby the presence of near surface anomalies is indicated by differences between time occurences of the same seismic event in said first and second sets.

6. The method of common depth point seismic exploration which comprises:
  generating two multifold common depth point record sections wherein at least one of said sections is partial fold and wherein the sections have significant differences in the surface coverage for at least one of the common depth points covered by each said record section.

7. The method of claim 6 wherein both said record sections are generated as partial fold record sections where the surface coverages in each case are not common.

8. The method of claim 6 wherein one of said record sections is a full fold common depth point section and the other record section is a partial fold common depth point section.

9. The method of claim 1 wherein said first and second sets of traces are detected at surface locations along a linear surface traverse.

10. The method of claim 1 wherein said first and second sets of traces are detected at surface locations along a non-linear surface traverse.

11. The method of claim 2 wherein said first, second and third sets of traces are detected at surface locations along a linear traverse.

12. The method of claim 2 wherein said first, second and third sets of traces are detected at surface locations along a non-linear traverse.

13. The method of claim 3 wherein said first and second sets of traces are detected at surface locations along a linear surface traverse.

14. The method of claim 3 wherein said first and second sets of traces are detected at surface locations along a non-linear surface traverse.

15. A system for delineating near surface anomalies in common depth point seismic surveying where a shot point and detector spread are moved continuously along a traverse which comprises:
  a. means for generating a first set of common depth point traces for said traverse with partial fold coverage by combining traces containing energy reflected from common depth points and detected in a first fraction of the surface locations in spreads of full fold detector locations, and
  b. means for generating a second set of common depth point traces for said traverse with partial fold coverage by combining traces containing energy reflected from said common depth points and detected in a second fraction of the surface locations in spreads of full fold detector locations where said first fraction and said second fraction are spaced one from another on the earth's surface, whereby the presence of near surface anomalies is indicated by differences between time occurrences of the same seismic event in said first and second sets.

16. A system for delineating near surface anomalies in common depth point seismic surveying where a shot point and detector spread are moved successively along a traverse which comprises:
  a. means for generating a first set of common depth point traces for said traverse with full fold coverage for production of each trace in said first set,
  b. means for generating a second set of common depth point traces for said traverse with partial fold coverage by combining traces containing energy reflected from common depth points and detected in a first fraction of the surface locations in spreads of full fold detector locations, and
  c. means for generating a third set of common depth point traces for said traverse with partial fold coverage by combining traces containing energy reflected from said common depth points and detected in a second fraction of the surface locations in spreads of said full fold detector locations where said first fraction and said second fraction are spaced one from another on the earth's surface, whereby the presence of near surface anomalies is indicated by differences between time occurrences of the same seismic event in said first, second and third sets.

17. A system for delineating near surface anomalies in common depth point seismic surveying where a shot point and detector spread are moved continuously along a traverse which comprises:
  a. means for generating a first set of common depth point traces for said traverse with full fold coverage by combining traces containing energy reflected from common depth points, and b. means for generating a second set of common depth point traces for said traverse but with only partial fold coverage by combining traces containing energy reflected from said common depth points and detected in a fraction of the surface locations in spreads of full fold detector locations, whereby the presence of near surface anomalies is indicated by differences between time occurrences of the same seismic event in said first and second sets.

18. A system for delineating near surface anomalies in common depth point seismic surveying where a shot point and detector spread are moved successively to locations along a traverse which comprises:

a. means for generating a first set of partial fold common depth point traces for said traverse, and b. means for generating a second set of partial fold common depth point traces for said traverse where said first set and said second set have common depth points but uncommon coverage of the earth's surface, whereby the presence of near surface anomalies is indicated by differences between time occurrences of the same seismic event in said first and second sets.

19. The system of claim 15 wherein said surface locations are dispersed along a linear traverse.

20. The system of claim 15 wherein said surface locations are dispersed along a non-linear configuration.

21. The system of claim 16 wherein said surface locations are dispersed along a linear traverse.

22. The system of claim 16 wherein said surface locations are dispersed along a non-linear configuration.

23. The system of claim 17 wherein said surface locations are dispersed along a linear traverse.

24. The system of claim 17 wherein said surface locations are dispersed along a non-linear configuration.

* * * * *